US009258987B1

(12) United States Patent
Vigeant (10) Patent No.: US 9,258,987 B1
(45) Date of Patent: Feb. 16, 2016

(54) SPINNING FISHING REEL WITH HAND GRIP (71) Applicant: Mark C. Vigeant, Thompson, CT (US)

(72) Inventor: Mark C. Vigeant, Thompson, CT (US)

(*) Notice: Subject to any disclaimer, the term of this patent is extended or adjusted under 35 U.S.C. 154(b) by 0 days.

(21) Appl. No.: 14/617,152

(22) Filed: Feb. 9, 2015

Related U.S. Application Data

(63) Continuation-in-part of application No. 13/766,382, filed on Feb. 13, 2013, now abandoned.

(51) Int. Cl.
*A01K 89/01* (2006.01)
*A01K 87/06* (2006.01)
*A01K 89/015* (2006.01)
*A01K 89/00* (2006.01)

(52) U.S. Cl.
CPC .............. *A01K 87/06* (2013.01); *A01K 89/006* (2013.01); *A01K 89/015* (2013.01)

(58) Field of Classification Search
CPC ............ A01K 89/01; A01K 89/01121; A01K 89/01127; A01K 89/01925
See application file for complete search history.

(56) References Cited

U.S. PATENT DOCUMENTS

| | | | |
|---|---|---|---|
| 2,711,292 A | 6/1955 | Taggart et al. | |
| 2,961,184 A | 11/1960 | Alford | |
| 3,437,282 A | 4/1969 | Honkonen et al. | |
| 4,108,392 A | 8/1978 | Masclet | |
| 4,209,931 A | 7/1980 | Vance | |
| D266,862 S | 11/1982 | Vance | |
| 4,697,377 A | 10/1987 | Martin | |
| 4,830,306 A | 5/1989 | Tsunoda et al. | |
| D309,936 S | 8/1990 | Hiraishi et al. | |
| D316,443 S | 4/1991 | Yoshikawa et al. | |
| D329,271 S | 9/1992 | Shiozaki | |
| 5,246,186 A * | 9/1993 | Sugawara | A01K 89/01 242/232 |
| D363,756 S | 10/1995 | DiGrazia | |
| 5,797,554 A | 8/1998 | Atherton et al. | |
| D491,999 S | 6/2004 | Scott | |
| 7,275,705 B1 * | 10/2007 | Wong | A01K 89/01 242/311 |
| D560,267 S | 1/2008 | Header et al. | |
| 2004/0124299 A1 * | 7/2004 | Tsutsumi | A01K 89/01 242/249 |
| 2008/0173743 A1 * | 7/2008 | Saito | A01K 89/006 242/227 |
| 2010/0001113 A1 * | 1/2010 | Grahl | A01K 89/01 242/310 |
| 2011/0174909 A1 * | 7/2011 | Shibata | A01K 89/0117 242/230 |
| 2013/0206889 A1 * | 8/2013 | Ochiai | A01K 89/00 242/322 |

* cited by examiner

*Primary Examiner* — Emmanuel M Marcelo (57) ABSTRACT

A spinning reel system for providing an ergonomic grip and increasing stability and control when fishing. A reel rotor and a reel handle are disposed on a reel body. A spacer is disposed between the rotor and the body. A reel support arm is angularly disposed on the body. A reel foot is angularly disposed on the support arm. The reel foot is adapted to be installed in a standard reel seat of a fishing pole. The reel rotor rotates and oscillates toward a body anterior end and a body posterior end. The support arm has grooves and protrusions for receiving the fingers of a user.

4 Claims, 6 Drawing Sheets

SPINNING FISHING REEL WITH HAND GRIP

CROSS REFERENCE

This application claims priority to U.S. patent application Ser. No. 13/766,382, filed Feb. 13, 2013, the specification(s) of which is/are incorporated herein in their entirety by reference.

FIELD OF THE INVENTION

The present invention relates to sporting equipment, or more specifically spinning reels for fishing poles.

BACKGROUND OF THE INVENTION

A fishing reel is a cylindrical device typically attached to a fishing rod for use in managing the line used for fishing. There are several predominant types of fishing reels commonly used in today's fishing including the spinning reel. The present invention features a spinning reel system for increased stability and control when fishing with a spinning reel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

A spinning fishing reel system for increasing stability and control and providing an ergonomically grip when fishing with a spinning reel is adapted to be installed in a standard reel seat of a fishing pole. In some embodiments, the spinning fishing reel system comprises a reel body. The system also comprises a rotating handle comprising a handle connector and a handle arm. In some embodiments, a spacer is disposed on the body middle section. A central axis is disposed through the reel body from the body anterior end to the body posterior end. In some embodiments, a reel rotor is disposed on the body anterior end. A reel support arm may be angularly disposed on the body posterior end. In some embodiments, a reel foot is angularly disposed on the support arm. The reel support arm and the body are angularly disposed such that they form a shape of a "V". In some embodiments, the reel foot is adapted to be inserted in a standard reel seat of a fishing pole.

DESCRIPTION OF PREFERRED EMBODIMENTS

Following is a list of elements corresponding to a particular element referred to herein:
100 spinning fishing reel system
110 reel body
111 body anterior end
112 body posterior end
113 body middle section
114 rotating handle
115 handle connector
116 handle arm
117 spacer
118 spacer anterior end
119 spacer posterior end
120 spacer exterior surface
125 central axis
130 reel rotor
131 rotor anterior end
132 rotor posterior end
133 rotor skirt
140 reel support arm
141 reel arm first end
142 reel arm second end
143 reel arm middle section
144 reel arm inside surface
150 protrusions
152 grooves
160 reel foot
161 reel foot anterior end
162 reel foot posterior end
163 reel foot middle section
164 reel foot top surface
165 reel foot bottom surface
201 first angle
202 second angle
210 support arm length
215 spacer length
220 foot length
225 rotor length
300 fishing pole
301 standard reel seat Referring now to FIGS. 1-6, the present invention features a spinning fishing reel system (100) for providing an ergonomic grip and increasing stability and control when fishing. In some embodiments, the system (100) is adapted to provide solid control and stability of the reel. In some embodiments, the system (100) is adapted for use with ice fishing and jig fishing.

As used herein, the term "unit" is defined as a unit of measurement, in particular, a measurement of length. A unit may be about 1 inch. In some embodiments, a unit may be about 0.5 inch. In other embodiments, a unit may be about 1.5 inches.

In some embodiments, the spinning fishing reel system (100) comprises a reel body (110) comprising a body anterior end (111), a body posterior end (112) and an elongated body middle section (113).

In some embodiments, the system (100) comprises a rotating handle (114) comprising a handle connector (115) and a handle arm (116). The handle connector (115) is pivotably disposed at or near the body posterior end (112) and is perpendicular to the body (110). In some embodiments, the handle arm (116) is attached to the handle connector (115).

In some embodiments, a spacer (117) is disposed on the body middle section (113). The spacer (117) may comprise a spacer anterior end (118), a spacer posterior end (119) and a spacer exterior surface (120). In some embodiments, the spacer anterior end (118) is adjacent to the body anterior end (111) and the spacer posterior end (119) is adjacent to the body posterior end (112). In some embodiments, the spacer (117) is generally cylindrical in shape.

In some embodiments, a spacer length (215) is about 1 unit. In some embodiments, the spacer length (215) is about 1.5 units. In some embodiments, the spacer length (215) is about 2 units. In some embodiments, the spacer length (215) is about 3 units.

In some embodiments, a central axis (125) is disposed through the reel body (110) from the body anterior end (111) to the body posterior end (112). The central axis (125) may be parallel to the spacer exterior surface (120) and perpendicular to the handle connector (115).

In some embodiments, a reel rotor (130) is disposed on the body anterior end (111). In some embodiments, the reel rotor (130) comprises a reel rotor anterior end (131), a reel rotor posterior end (132), and a reel rotor skirt (133). In some embodiments, the reel rotor skirt (133) is disposed at the rotor posterior end (132) and is adjacent to the spacer anterior end (118). In some embodiments, the rotor (130) rotates about the central axis (125) and alternatingly oscillates toward the body anterior end (111) and the body posterior end (112).

In some embodiments, a reel rotor length (225) is at least 2 units. In some embodiments, a reel rotor length (225) is about 3 units. In some embodiments, a reel rotor length (225) is about 4 units. In some embodiments, a reel rotor length (225) is between about 2 to 5 units.

In some embodiments, a reel support arm (140) may comprise a reel arm first end (141), a reel arm second end (142), a reel arm middle section (143) and a reel arm inside surface (144). The reel arm second end (142) may be angularly disposed on the body posterior end (112). In some embodiments, the reel arm inside surface (144) extends toward the body anterior end (111).

In some embodiments, a first angle (201) between the reel arm inside surface (144) of the support arm (140) and the central axis (125) is about 70°. In some embodiments, the first angle (201) between the reel arm inside surface (144) of the support arm (140) and the central axis (125) is about 80°. In some embodiments, the first angle (201) between the reel arm inside surface (144) of the support arm (140) and the central axis (125) is between about 45° and 90°. In some embodiments, the first angle (201) between the reel arm inside surface (144) of the support arm (140) and the central axis (125) is between about 60° and 90°.

In some embodiments, a support arm length (210) is about 3.5 units. In some embodiments, the support arm length (210) is at least 3 units. In some embodiments, the support arm length (210) is at least 4 units. In some embodiments, the support arm length (210) is between about 3 to 5 units in length. In some embodiments, the support arm length (210) is between about 4 to 6 units in length.

In some embodiments, the arm middle section (143) comprises 2 protrusions (150) and 3 grooves (152) disposed on the reel arm inside surface (144) for receiving fingers of a user. In some embodiments, each protrusion (150) is disposed between grouped pairs of the 3 grooves (152). In some embodiments, the arm middle section (143) comprises 3 protrusions (150) and 4 grooves (152) disposed on the reel arm inside surface (144). In some embodiments, each protrusion (150) is disposed between grouped pairs of the 4 grooves (152).

In some embodiments, the arm middle section (143) is adapted to fit the contours of the inside surface of the fingers of a user when gripping. In some embodiments, the arm middle section (143) comprises a diameter not less than 0.25 units. In some embodiments, the arm middle section (143) comprises a diameter not less than 0.5 units. In some embodiments, the arm middle section (143) comprises a diameter not less than 0.75 units. In some embodiments, the arm middle section (143) comprises a diameter not less than one unit. In some embodiments, the arm middle section (143) comprises a tapering diameter.

In some embodiments, a reel foot (160) may comprise a foot anterior end (161), a reel foot posterior end (162), a reel foot middle section (163), a reel foot top surface (164), and a reel foot bottom surface (165). In some embodiments, the foot anterior end (161) extends toward the body anterior end (111) and the foot posterior end (162) extends toward the body posterior end (112). In some embodiments, the reel foot (160) is angularly disposed on the support arm (140). In some embodiments, the foot bottom surface (165) at the foot middle section (116) is attached to the reel arm first end (141).

In some embodiments, a second angle (202) between the central axis (125) and the reel foot (160) at the foot anterior end (162) is about 6°. In some embodiments, the second angle (202) between the central axis (125) and the reel foot (160) at the foot anterior end (162) is about 5°. In some embodiments, the second angle (202) between the central axis (125) and the reel foot (160) at the foot anterior end (162) is about 7°. In some embodiments, the second angle (202) between the central axis (125) and the reel foot (160) at the foot anterior end (162) is between about 5° and 10°.

In some embodiments, a reel foot length (220) is about 2.2 units. In some embodiments, the reel foot length (220) is about 2 units. In some embodiments, the reel foot length (220) is about 3 units. In some embodiments, the reel foot length (220) is about is between about 2 and 4 units.

In some embodiments, a ratio of the support arm length (210) to the spacer length (215) is about 4:1. In some embodiments, a ratio of the support arm length (210) to the spacer length (215) is about 1:1. In some embodiments, a ratio of the support arm length (210) to the spacer length (215) is about 2:1. In some embodiments, a ratio of the support arm length (210) to the spacer length (215) is about 3:1. In some embodiments, a ratio of the support arm length (210) to the spacer length (215) is about 5:1.

In some embodiments, a ratio of the support arm length (210) to a reel foot length (220) is about 2:1. In some embodiments, a ratio of the support arm length (210) to a reel foot length (220) is about 3:1. In some embodiments, a ratio of the support arm length (210) to a reel foot length (220) is about 1:1.

In some embodiments, a ratio of the support arm length (210) to the spacer length (215) combined with the rotor length (225) (i.e. the sum of the lengths of the spacer and rotor) is about 1:1. In some embodiments, a ratio of the support arm length (210) to the spacer length (215) combined with a rotor length (225) is about 3:2. In some embodiments, a ratio of the support arm length (210) to the spacer length (215) combined with a rotor length (225) is about 4:3.

In some embodiments, the reel support arm (140) and the body (110) are angularly disposed such that they form a shape of a "V". In some embodiments, the foot anterior end (161) is disposed above the reel rotor (130) or the spacer (117). In preferred embodiments, a user is able to comfortably rest the side of his or her hand at or near the vertex formed by the reel support arm (140) and the body (110).

Figure 1:
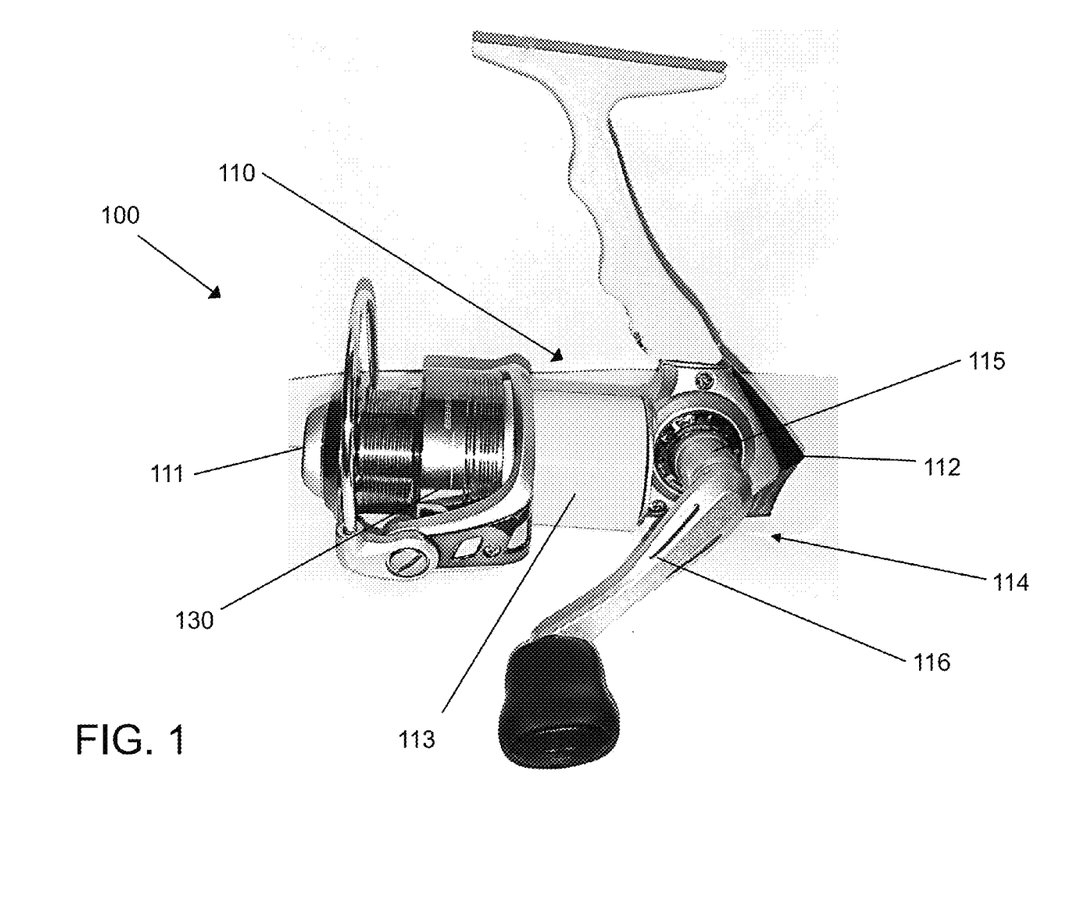
FIG. 1 shows a side view of the present invention.
Figure 2:
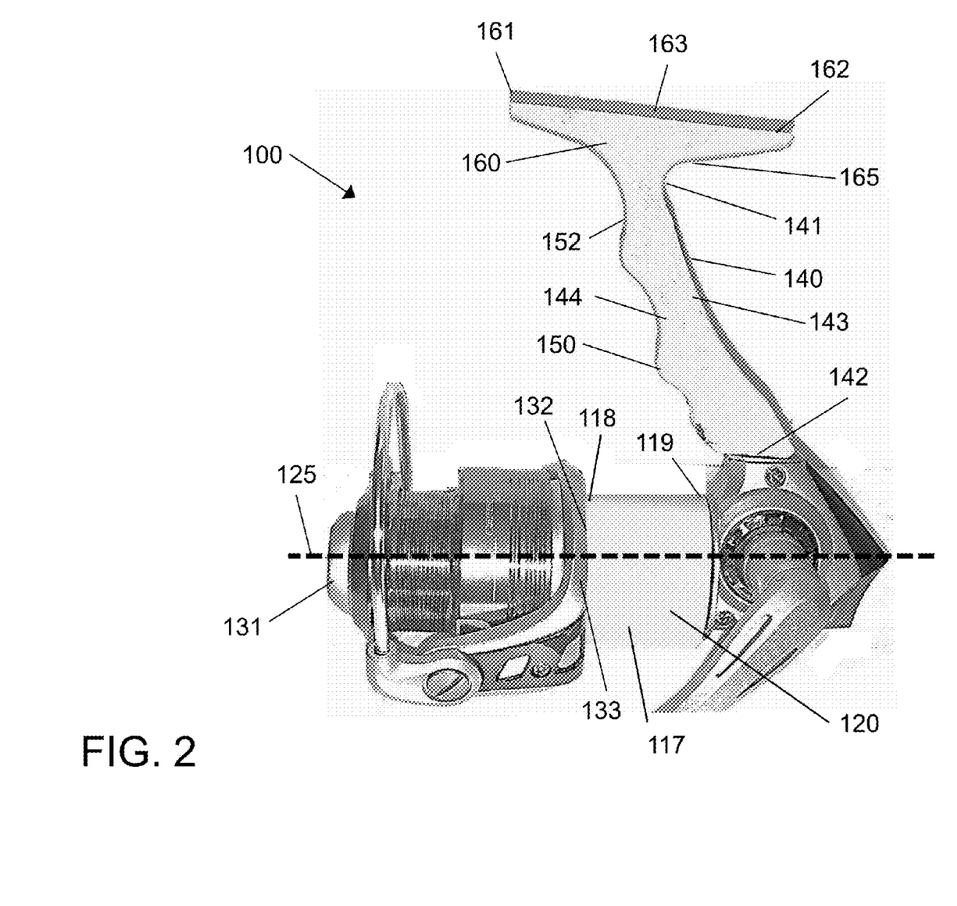
FIG. 2 shows a side view of the present invention.
Figure 3:
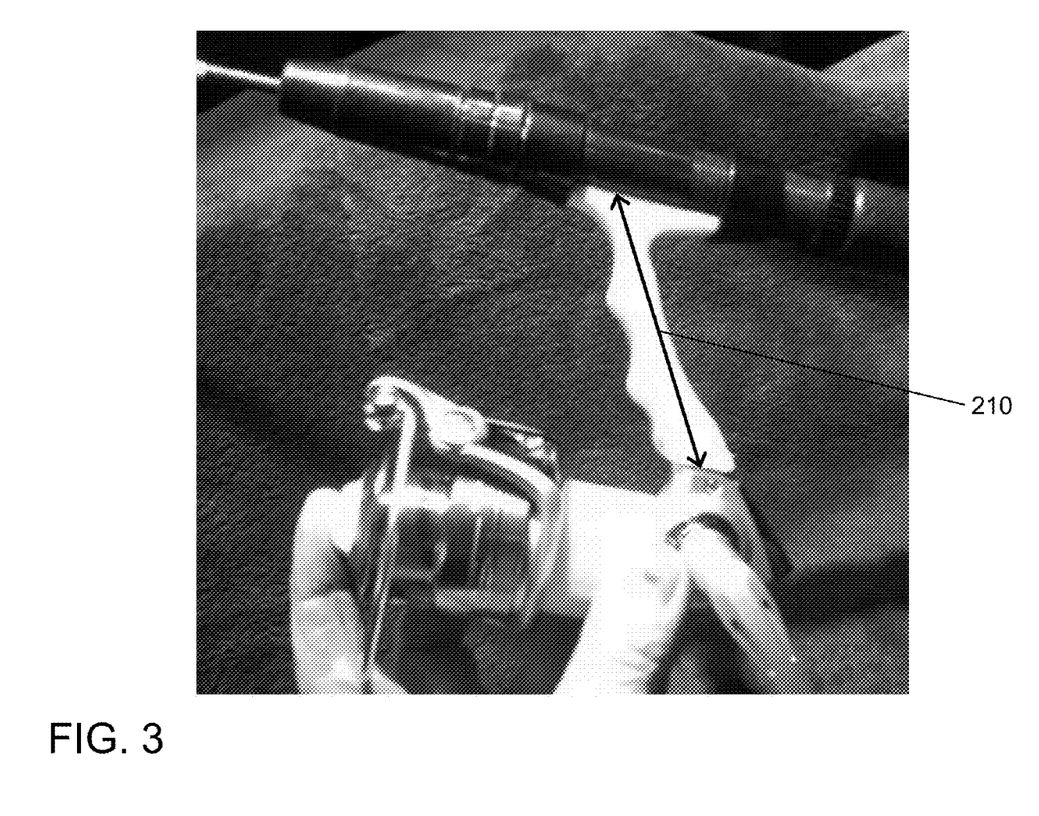
FIG. 3 shows the present invention mounted to a fishing rod.
Figure 4:
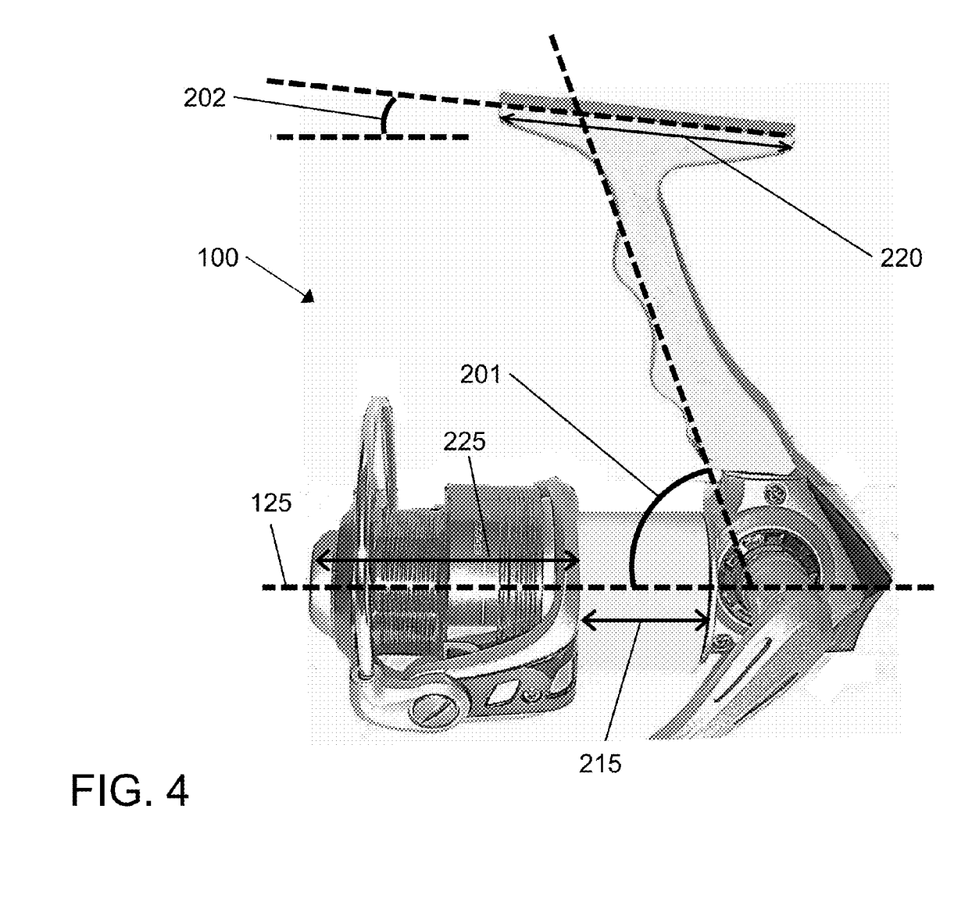
FIG. 4 shows a side view of the present invention.
Figure 5:
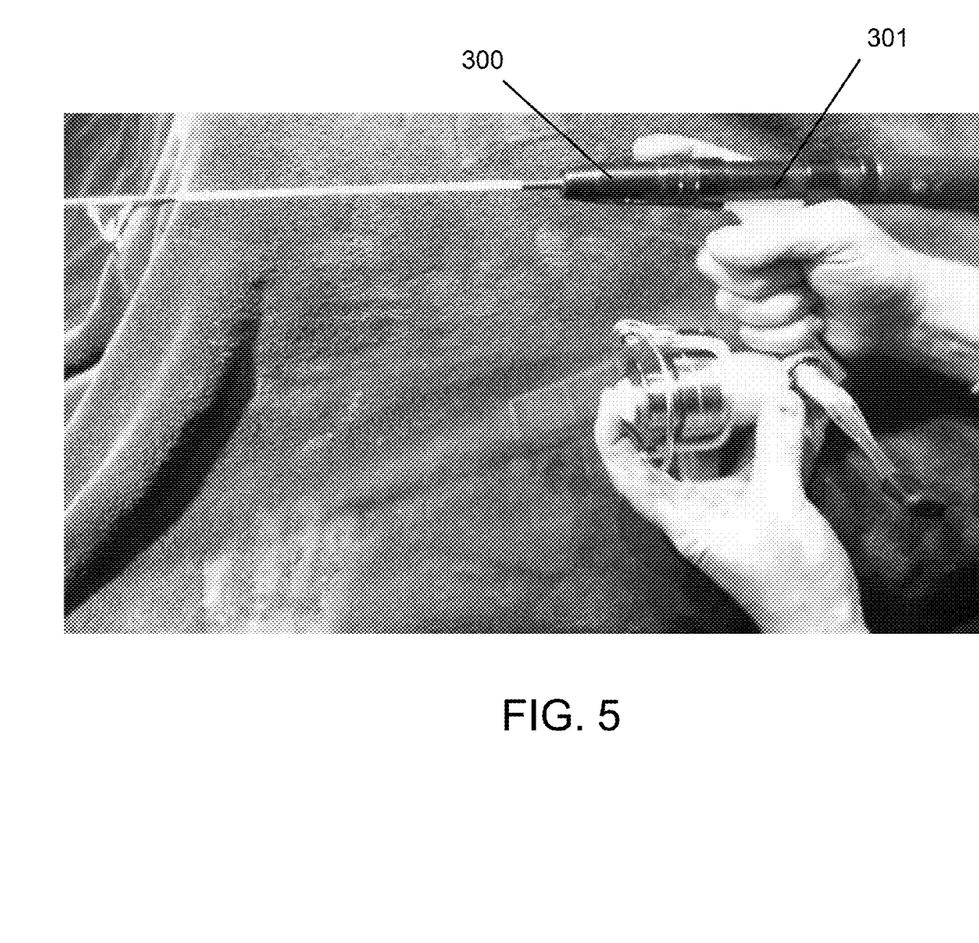
FIG. 5 shows the present invention mounted to a fishing rod.

In some embodiments, the reel foot (160) is adapted to be inserted in a standard reel seat (301) of a fishing pole (300). In some embodiments, the reel foot (160) is adapted to be used on all existing fishing poles.

In preferred embodiments, the spinning fishing reel system (100) provides increased stability and control. In preferred embodiments, the spacer (117) provides sufficient space between a user's hand and the reel rotor (130) when the user is gripping the reel support arm (140). In preferred embodiments, the reel support arm (140) provides an ergonomic grip.

Figure 6:
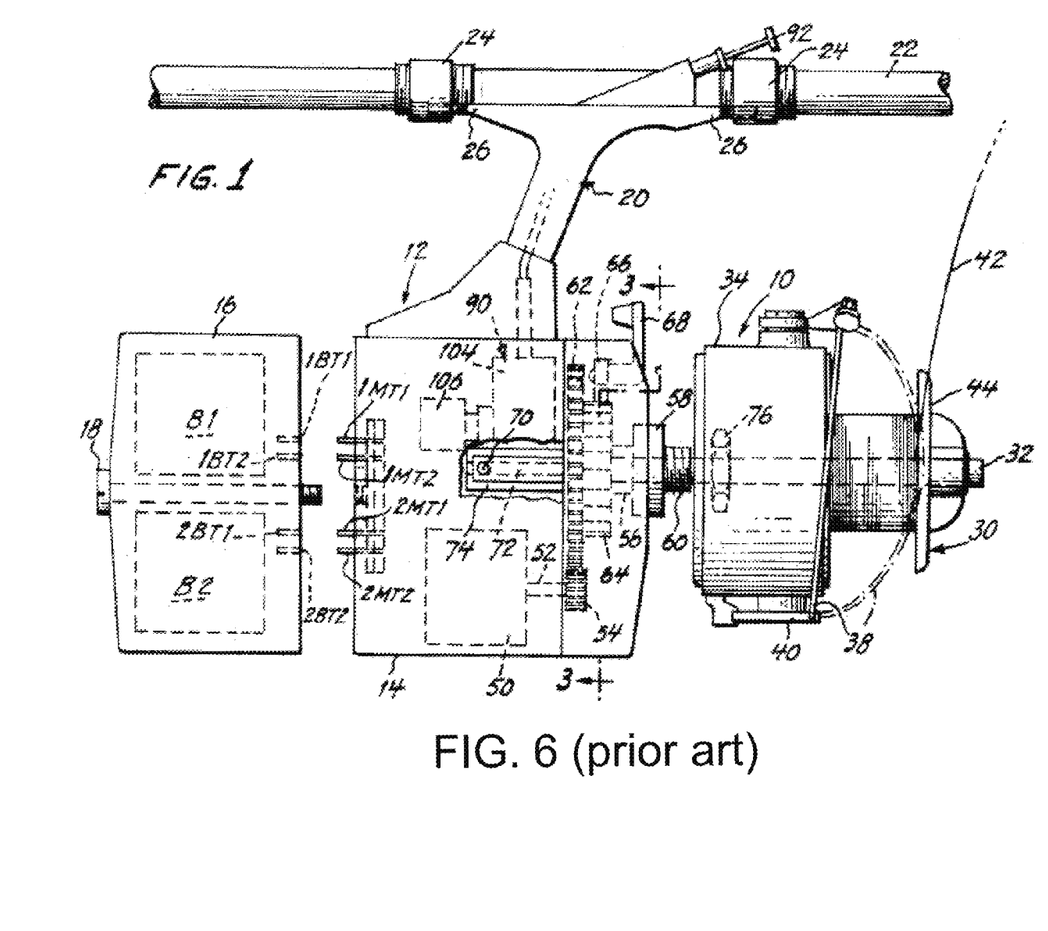
FIG. 6 shows a prior art of a reel system.

As shown in FIG. 6, conventional spinning reels lack the space for a user to grip a support arm and are not ergonomic. They also lack the angle between the central axis and the reel foot since they tend to have the reel foot parallel to the central axis.

As used herein, the term "about" refers to plus or minus 10% of the referenced number.

The disclosures of the following U.S. patents are incorporated in their entirety by reference herein: U.S. Pat. No. D 491,999; U.S. Pat. No. D 363,756; U.S. Pat. No. D 316,443; U.S. Pat. No. D 266,862; U.S. Pat. No. 3,437,282; U.S. Pat. No. 2,961,184; U.S. Pat. No. 4,697,377; and U.S. Pat. No. 4,209,931.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A spinning fishing reel system (100) for providing an ergonomic grip and increasing stability and control when fishing, the system (100) comprising:
   a. a reel body (110) comprising a body anterior end (111), a body posterior end (112) and an elongated body middle section (113);
   b. a rotating handle (114) comprising a handle connector (115) and a handle arm (116), wherein the handle connector (115) is disposed at or near the body posterior end (112), wherein the handle connector (115) is perpendicular to the body (110), wherein the handle arm (116) is attached to the handle connector (115);
   c. a spacer (117) disposed on the body middle section (113), wherein the spacer (117) comprises a spacer anterior end (118), a spacer posterior end (119) and a spacer exterior surface (120), wherein the spacer anterior end (118) extends toward to the body anterior end (111) and the spacer posterior end (119) extends toward the body posterior end (112), wherein the spacer (117) is generally cylindrical in shape;
   d. a central axis (125) disposed through the reel body (110) from the body anterior end (111) to the body posterior end (112), wherein the central axis (125) is parallel to the spacer exterior surface (120) and perpendicular to the handle connector (115);
   e. a reel rotor (130) disposed on the body anterior end (111), wherein the reel rotor (130) comprises a reel rotor anterior end (131), a reel rotor posterior end (132), and a reel rotor skirt (133) disposed at the rotor posterior end (132) and adjacent to the spacer anterior end (118), wherein the rotor (130) rotates about the central axis (125) and alternatingly oscillates toward the body anterior end (111) and the body posterior end (112);
   f. a reel support arm (140) having a reel arm first end (141), a reel arm second end (142), a reel arm middle section (143) and a reel arm inside surface (144), wherein the reel arm second end (142) is angularly disposed on the body posterior end (112), wherein the reel arm inside surface (144) extends toward the body anterior end (111), wherein a first angle (201) between the reel arm inside surface (144) of the support arm (140) and the central axis (125) is about 70°, wherein the arm middle section (143) comprises 2 protrusions (150) and 3 grooves (152) disposed on the reel arm inside surface (144) for receiving fingers of a user, wherein each protrusion (150) is disposed between grouped pairs of the 3 grooves (152); and
   g. a reel foot (160) having a foot anterior end (161), a reel foot posterior end (162), a reel foot middle section (163), a reel foot top surface (164), and a reel foot bottom surface (165), wherein the foot anterior end (161) extends toward the body anterior end (111), wherein the foot posterior end (162) extends toward the body posterior end (112), wherein the reel foot (160) is angularly disposed on the support arm (140), wherein the foot bottom surface (165) at the foot middle section (116) is attached to the reel arm first end (141), wherein a second angle (202) between the central axis (125) and the reel foot (160) at the foot anterior end (162) is about 6°;
   wherein a ratio of a support arm length (210) to a spacer length (215) is about 4:1;
   wherein a ratio of the support arm length (210) to a reel foot length (220) is about 2:1;
   wherein a standard reel seat (301) of a fishing pole (300) is disposed on the reel foot (160);
   wherein the spinning fishing reel system (100) provides increased stability and control;
   wherein the spacer (117) provides sufficient space between a user's hand and the reel rotor (130) when the user is gripping the reel support arm (140), and wherein the reel support arm (140) provides an ergonomic grip.

2. The spinning fishing reel system (100) of claim 1, wherein a ratio of the support arm length (210) to the spacer length (215) combined with a rotor length (225) is about 1:1.

3. The spinning fishing reel system (100) of claim 1, wherein a ratio of the support arm length (210) to the spacer length (215) combined with a rotor length (225) is about 3:2.

4. A spinning fishing reel system (100) for providing an ergonomic grip and increasing stability and control when fishing, the system (100) consisting of:
   a. a reel body (110) consisting of a body anterior end (111), a body posterior end (112) and an elongated body middle section (113);
   b. a rotating handle (114) consisting of a handle connector (115) and a handle arm (116), wherein the handle connector (115) is disposed at or near the body posterior end (112), wherein the handle connector (115) is perpendicular to the body (110), wherein the handle arm (116) is attached to the handle connector (115);

c. a spacer (117) disposed on the body middle section (113), wherein the spacer (117) consists of a spacer anterior end (118), a spacer posterior end (119) and a spacer exterior surface (120), wherein the spacer anterior end (118) is adjacent to the body anterior end (111) and the spacer posterior end (119) is adjacent to the body posterior end (112), wherein the spacer (117) is generally cylindrical in shape;

d. a central axis (125) disposed through the reel body (110) from the body anterior end (111) to the body posterior end (112), wherein the central axis (125) is parallel to the spacer exterior surface (120) and perpendicular to the handle connector (115);

e. a reel rotor (130) disposed on the body anterior end (111), wherein a reel rotor skirt (133) is disposed at a rotor posterior end (132) and adjacent to the spacer anterior end (118), wherein the rotor (130) rotates about the central axis (125) and alternatingly oscillates toward the body anterior end (111) and the body posterior end (112);

f. a reel support arm (140) consisting of a reel arm first end (141), a reel arm second end (142), a reel arm middle section (143) and a reel arm inside surface (144), wherein the reel arm second end (142) is angularly disposed on the body posterior end (112), wherein the reel arm inside surface (144) is biased towards the body anterior end (111), wherein a first angle (201) between the reel arm inside surface (144) of the support arm (140) and the central axis (125) is about 70°, wherein the arm middle section (143) consists of 2 protrusions (150) and 3 grooves (152) disposed on the reel arm inside surface (144) for receiving fingers of a user, wherein each said protrusion (150) is disposed between grouped pairs of the 3 grooves (152); and g. a reel foot (160) consisting of a foot anterior end (161), a reel foot posterior end (162), a reel foot middle section (163), a reel foot top surface (164), and a reel foot bottom surface (165), wherein the foot anterior end (161) is biased towards the body anterior end (111), wherein the foot posterior end (162) extends toward the body posterior end (112), wherein the reel foot (160) is angularly disposed on the support arm (140), wherein the foot bottom surface (165) at the foot middle section (116) is attached to the reel arm first end (141), wherein a second angle (202) between the reel foot (160) and the central axis (125) is about 6°;

wherein a ratio of a support arm length (210) to a spacer length (215) is about 4:1;

wherein a ratio of the support arm length (210) to a reel foot length (220) is about 2:1;

wherein a standard reel seat (301) of a fishing pole (300) is disposed on the reel foot (160);

wherein the spinning fishing reel system (100) provides increased stability and control;

wherein the spacer (117) provides sufficient space between a user's hand and the reel rotor (130) when the user is gripping the reel support arm (140), and wherein the reel support arm (140) provides an ergonomic grip.

\* \* \* \* \*